Dec. 13, 1927.
V. E. ROUCH ET AL
1,652,733
ELECTRICAL TIRE PRESSURE INDICATOR
Filed April 28, 1924
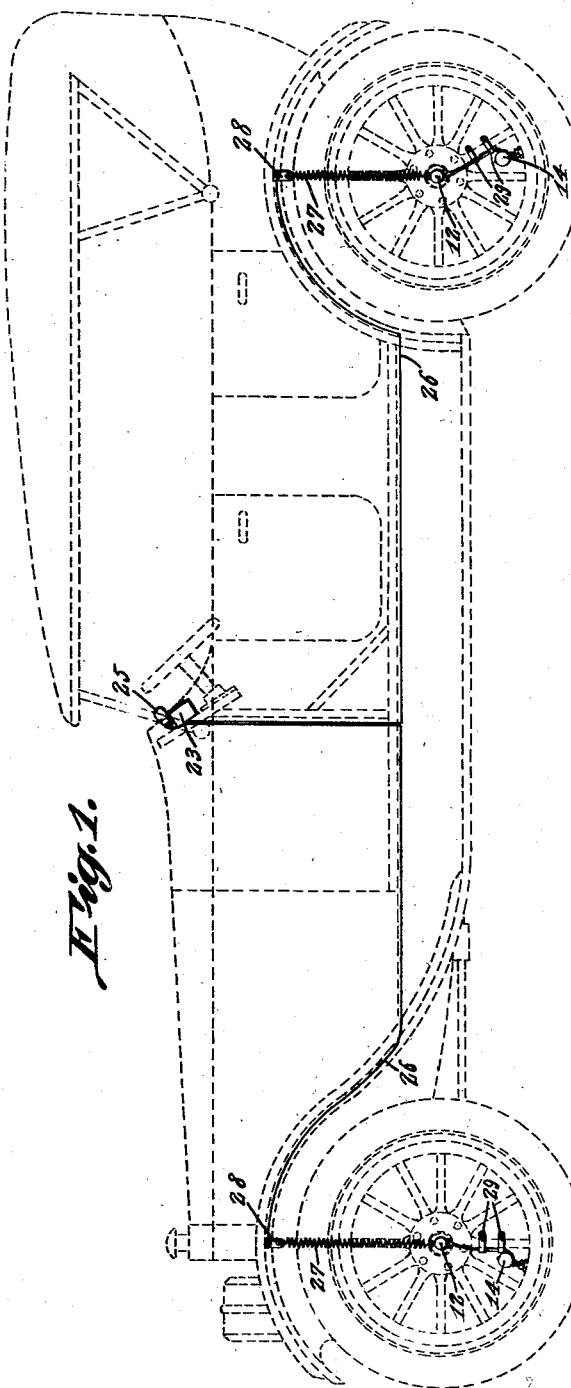
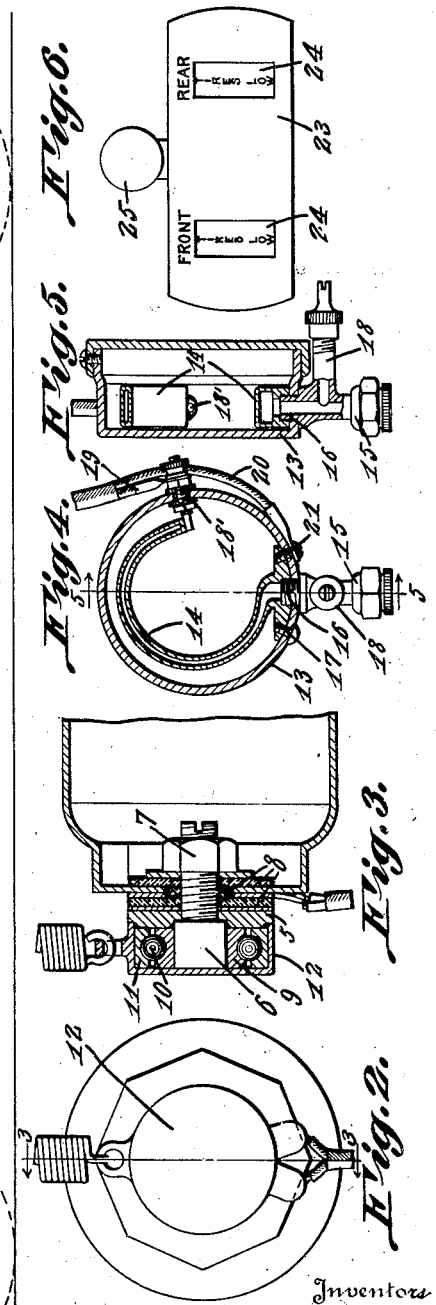
Inventors
V. E. Rouch
and W. J. Abbott,
By C. A. Snow & Co.
Attorneys Patented Dec. 13, 1927.

1,652,733

UNITED STATES PATENT OFFICE.

VERNEN E. ROUCH AND WILLIAM J. ABBOTT, OF FULTON, INDIANA.

ELECTRICAL TIRE-PRESSURE INDICATOR.

Application filed April 28, 1924. Serial No. 709,608.

The present invention relates to an air pressure indicating device to be employed in connection with pneumatic tires of motor vehicles for signaling to the operator when the air pressure within a tire has reached a dangerously low degree.

Another important object of the invention is to provide a device of this character which may be readily and easily installed on motor vehicles now in use, eliminating the necessity of making alterations in the motor vehicle construction to accomplish the installing of the device.

Another object of the invention is to provide a device which will be purely automatic in its operation and one which is electrically controlled.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a diagrammatical view disclosing the invention as installed on a motor vehicle.

Figure 2 is a front elevational view of the hub cap attachment, forming a part of the invention.

Figure 3 is a sectional view taken on line 3—3 of Figure 2.

Figure 4 is a sectional view through the expansible contact housing that is secured to the valve stem of the tire.

Figure 5 is a sectional view taken on line 5—5 of Figure 4.

Figure 6 is an elevational view of the recording instrument forming a part of the invention and which is supported on the instrument board.

Referring to the drawings in detail, the invention includes a hub cap attachment that comprises a disk 5 which is held to the usual hub cap by means of a bolt 6 which extends through a suitable opening in the hub cap and is secured in position by means of the nut 7, suitable insulating disks 8 being provided for insulating the bolt from the hub cap.

Supported by the bolt 6 is a bearing member 9 formed with a suitable groove to accommodate the ball bearings 10 which are held to the bearing 9 by means of the bearing section 11 which supports the cap 12 that is designed to remain stationary while the bearing member 9 rotates with the hub of the wheel to which the device is secured. Associated with the attachment is a switch housing 13 that supports the curved expansible tube 14, one end of the tube being in communication with the usual valve stem of the tire through the union 15, which is shown as having its threaded end 16 positioned in one end of the tube, which is secured within the housing by means of the screws 17.

An inflating stem 18 also communicates with the union 15 so that the discharge pipe of a pump or other air supply, may be connected therewith to inflate the tire.

A contact member indicated at 18 is supported by the housing 13 and is in circuit with a suitable source of electric supply through the wire 19, the return circuit including the wire 20 that is shown as having one end thereof secured to the tube 14 at 21.

These wires 19 and 20 are also in circuit with an electro-magnet, not shown and which may be supported in the body of the motor vehicle, so that when the expansible tube 14 moves into engagement with the contact member 18, the circuit to the magnet will be completed. Associated with the magnet, which is supported within the indicator casing 23 are rotary indicating members 24 to be attracted by the magnets to the end that as this circuit is completed to the magnet, the magnet will operate to rotate the indicating member 24 associated therewith to cause certain reading matter carried thereon to be displayed before the sight openings of the housing 23. A suitable lamp indicated at 25 is also in circuit with the magnet so that when the magnet is energized, the lamp will be simultaneously lighted to permit the reading of the indicator in the dark.

It is to be understood that the magnets are arranged in pairs, each magnet being in circuit with a certain switch mechanism carried by a wheel of a motor vehicle, to the end that when the air pressure in a tire becomes dangerously low, the expansible member 14 will be caused to expand under the resiliency of the metal of which the same is formed to cause the contact member carried thereby to engage the contact member 18 completing the circuit in a manner as described.

The wires 18 and 19 are in circuit with the bolt 6 which in turn is in circuit with the wire 26 through the coiled spring 27 that has one end thereof secured to the mud guard of the motor vehicle by means of the clamp 28. Suitable clamping members indicated at 29 are secured to one of the spokes of the wheel to support the wires 19 and 20 and hold them in proper relation with the switch housing 13.

While we have described the switch mechanism employed for energizing the magnet for indicating the air pressure in one tire, it is to be understood that a device of identical construction described is employed on each wheel of the vehicle so that the operator may tell at a glance which tire has become deflated.

We claim:—

In a device of the character described, a switch housing adapted to be secured to a valve stem, a switch member within the switch housing and controlled by the air pressure within the switch housing, a contact member including a bolt adapted to be passed through a hub cap of a wheel, wires leading from the switch member to the bolt, a bearing member supported on the bolt, a cap, a bearing member within the cap, bearings supported between the bearing members to permit the last mentioned cap to revolve, a coiled spring connected with the cap and having connection with a fender of a motor vehicle, said spring providing a circuit, and wires leading from the spring to a signaling device.

In testimony that we claim the foregoing as our own, we have hereto affixed our signatures.

VERNEN E. ROUCH.
WILLIAM J. ABBOTT.